E. G. RUST.
EXCAVATING AND LOADING MACHINE.
APPLICATION FILED JAN. 4, 1919.
1,311,621.
Patented July 29, 1919.
2 SHEETS—SHEET 2.
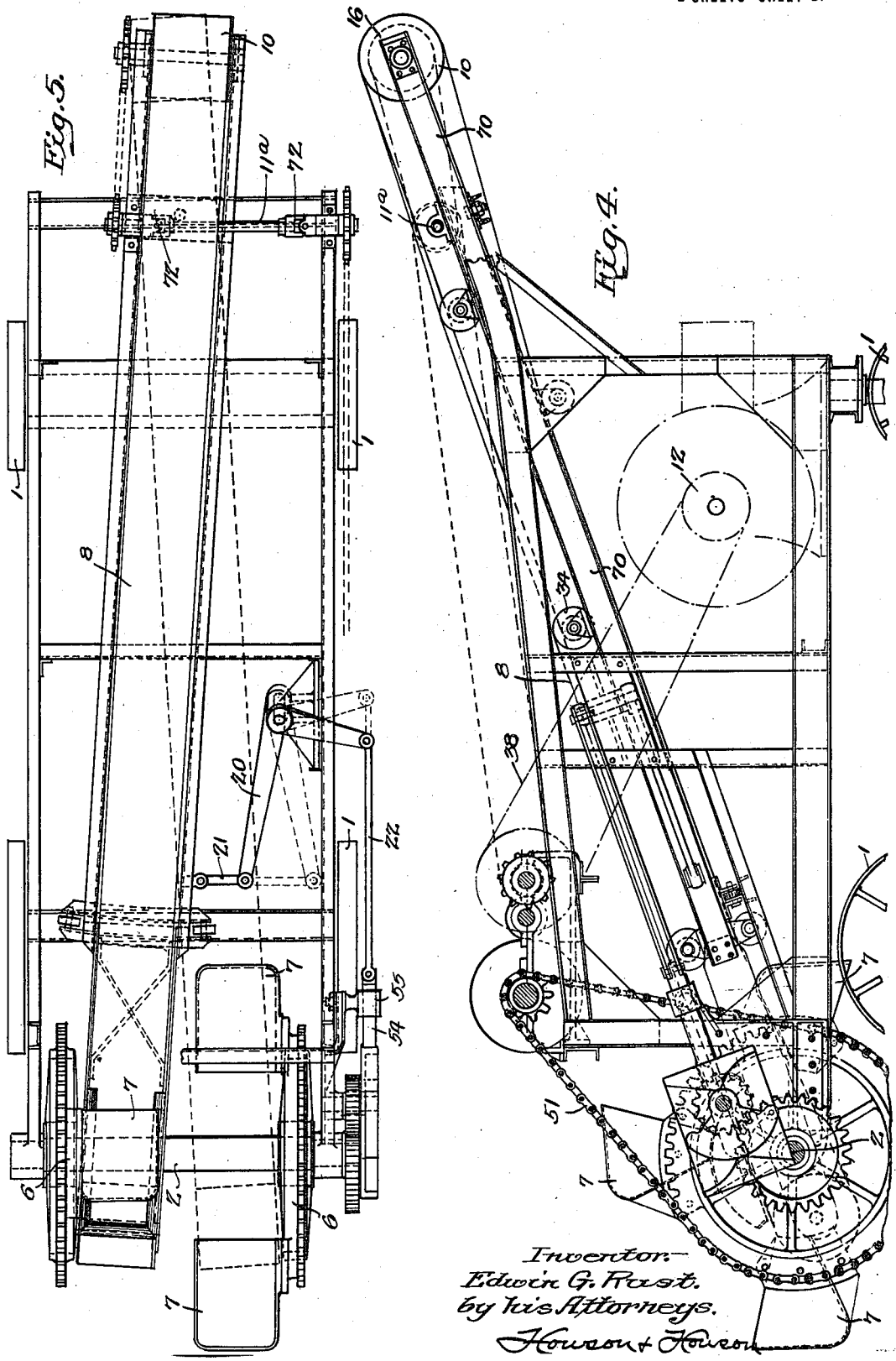
Inventor—
Edwin G. Rust.
by his Attorneys.
Howson & Howson

UNITED STATES PATENT OFFICE.

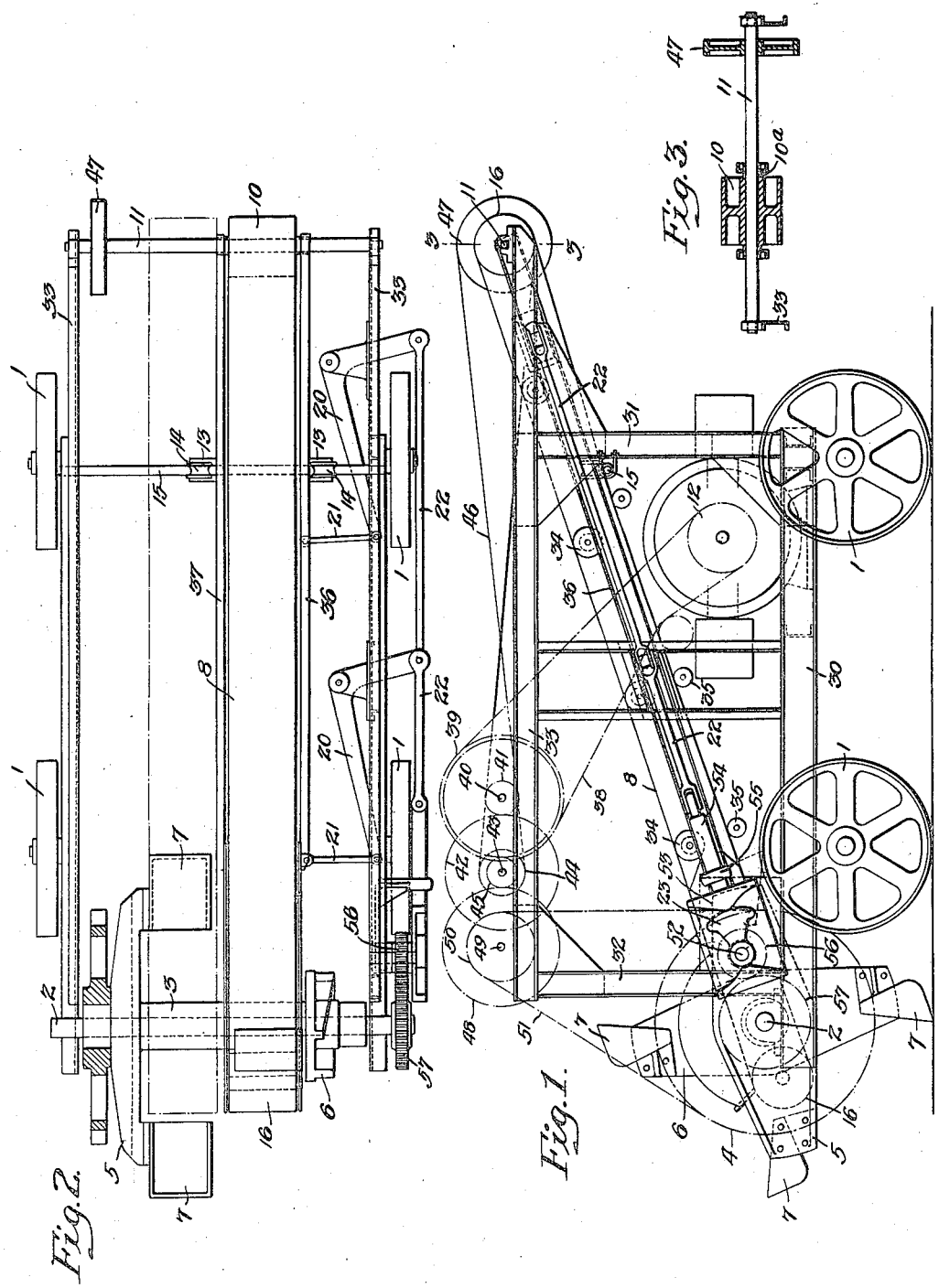

EDWIN G. RUST, OF PHILADELPHIA, PENNSYLVANIA.

EXCAVATING AND LOADING MACHINE.

1,311,621. Specification of Letters Patent. Patented July 29, 1919.

Application filed January 4, 1919. Serial No. 269,555.

*To all whom it may concern:*

Be it known that I, EDWIN G. RUST, a citizen of the United States, residing in Philadelphia, Pennsylvania, have invented Excavating and Loading Machines, of which the following is a specification.

One object of my invention is to provide novel means for supporting and operating an endless conveyer in such manner that it will be capable of receiving material discharged from one or more conveying devices operative at its sides, and more particularly so that it may properly coöperate with two rotary or endless sets of scoops, buckets or shovels into whose planes of rotation its receiving portion is alternately moved.

Another object of the invention is to provide a novel construction and arrangement of shovels or buckets with a receiving conveyer whereby it shall be possible to materially shorten and render more compact and substantial the machine as a whole;—the invention in its preferred form contemplating a plurality of sets of excavating or conveying buckets or shovels, with a conveyer operative between the same and means for periodically shifting said conveyer, so that while it alternately receives the material from the buckets of the two sets, it does not interfere with their continuous rotation.

I further desire to provide a novel combination of parts whereby a rotary shovel or series of shovels and an endless conveyer may operate in the same plane during the delivery of material therefrom and thereafter operate in different planes in order to permit the continued rotation of the shovel without interference from or injury to said conveyer;—the invention contemplating a simple, inexpensive and substantial form of loading or excavating machine including a novel arrangement of excavating or loading elements, and an endless conveyer operated to receive material alternately from said elements.

The invention also has for its object the provision of a novel combination of supporting structure and conveyer together with mechanism whereby said conveyer is laterally shifted on said structure from one to the other of two definite positions.

These objects and other advantageous ends I attain as hereinafter set forth, reference being had to the accompanying drawings, in which, Figure 1 is a side elevation, to some extent diagrammatic, and partly in section, illustrating a machine constructed in accordance with my invention;

Fig. 2 is a plan of the machine shown in Fig. 1 omitting certain of the structures for the sake of clearness;

Fig. 3 is a vertical section, taken on the line 3—3, Fig. 1.

Figs. 4 and 5 are respectively a side elevation and a plan of a modified form of my invention.

In the above drawings 1 represents two pairs of supporting wheels on which is mounted an open frame including bottom, horizontal members 30, front and back vertical members 3 and 32, and horizontal top members 33, together with various connecting and bracing elements preferably made of rolled structural sections. The rear ends of the bottom members 30 are extended beyond the back vertical members 32 and carry bearings in which is journaled a transverse main shaft 2 having fixed to it by any suitable means a relatively heavy sleeve or shaft 3 carrying adjacent its extremities two arms or wheels 5 and 6 extending at right angles to each other. Each of these arms carries at its outer ends buckets or scoops 7 of suitable form so mounted that the buckets of each arm extend toward those on the other arm for a distance in the present case slightly less than half the distance between said arms, being so positioned on the arms that as they approach their uppermost positions during the rotation of the arms, they will discharge their contents under the action of gravity in a direction radial substantially of the shaft 2.

For receiving the material so discharged from these shovels or excavators I provide a conveyer 8 illustrated as consisting of an endless belt mounted on two supporting pulleys 10 and 16 engaging its ends and having its upper run supported intermediate of these pulleys by idlers 34, there being other idlers 35 for similarly supporting the lower run of the conveyer. The pulley 10 for supporting the upper end of the conveyer is keyed or otherwise fixed to a sleeve $10^a$ slidably mounted on the squared part of a shaft 11 and rotatable in bearings provided in the upper end of the conveyer frame. Said shaft extends transversely of and is mounted in bearings carried by the top frame members 33, while the balance of the conveyer and the lower supporting pulley 16 with the idler pulleys 34 and 35 are mounted on and carried by the conveyer frame whose side members are indicated at 36 and 37. These latter are rigidly connected by suitable structures of which two are shown at 13 as extended to support short spindles for concave rollers 14. These are operative on a guide or track provided by a pipe or shaft 15 extending between and clamped to the vertical front members 31 of the frame. This cross member 15 thus carries the forward portion of the endless conveyer whose rear frame members 37 are provided with openings and surround and are laterally slidable upon and are carried by the main shaft or sleeve 2. The width of the conveyer belt 8 is preferably slightly greater than the distance between the sides of any one of the shovels or buckets 7 and by reason of the mounting and construction above described the conveyer may be bodily shifted so that it will be in the path of revolution of the buckets 7 on the arm 5 or in the path of revolution of the buckets on the arm 6.

For rotating the main shaft 2 with its buckets I provide a suitable motor shown diagrammatically in the present instance as an internal combustion engine 12 carried on the forward part of the frame and having on its main shaft a sprocket wheel or pulley which, through a suitable chain or belt 38, drives a second pulley 39 fixed to a shaft 40. The latter is journaled in suitable bearings in the present instance carried by the top frame members 33 and has fixed to it a gear 41 meshing with a larger gear 42 fixed to a second shaft 43. This latter has in turn fixed to it a pulley 44 and gear 45 of which the former through a belt 46 drives a pulley 47 fixed to the shaft 11 on which is mounted the upper pulley 10 of the endless conveyer. The gear 45 coöperates with a larger gear 48 fixed to a third shaft 49 journaled at the upper rear end of the frame members 33 and having also fixed to it a sprocket wheel 50. This through a suitable chain 51, is operatively connected to a sprocket wheel 4 fixed to the main shaft 2.

For periodically shifting the position of the endless conveyer 8 in order that it may receive material discharged by both sets of buckets 7 carried by the arms 5 and 6 and move out of the path of the approaching bucket, I provide a cam 23 mounted on a short spindle 52 and operative in a block or cross head 53 having at one side an extension or arm 54 slidable in a guide or bracket 55 supported from one of the bottom frame members 30. This arm through links 22 is connected to the short arms of a pair of bell crank levers 20 fulcrumed on brackets carried by the frame of the machine and having their long arms connected through links 21 to the adjacent side member 36 of the endless conveyer frame. For driving the cam 23 I mount on its supporting shaft a gear 56 and drive this latter from a second gear 57 fixed to the main shaft 2.

Under conditions of operation the machine is run on its wheels 1 to any desired position so that its bucket conveyers may engage or enter the material to be excavated or loaded and the motor 12 is put in operation so that the shaft 2 with its arms 5 and 6 is turned in a clockwise direction;— the belt 8 of the endless conveyer, through power applied to the shaft 11 and pulley 12, being driven so that its upper run travels from the rear to the front of the machine. Obviously if said conveyer remained in any one position it would shortly be struck by one of the buckets 7 after receiving the material discharged therefrom as the arm carrying said bucket was turned with the shaft 2. The cam 23 however is so designed and the gearing for driving it is so timed that as one of the buckets 7 of the arm 6, for example, approaches the vertical position shown in Fig. 1, the belt of the endless conveyer is immediately under it and receives the material which flows out of or is discharged from said bucket under the action of gravity.

For insuring that this material will be retained upon the belt 8 I form the frame members 37 with or attach to them flaring side portions 60 and a back member 61 to constitute a hopper which however is open on its forward side and bottom. Immediately after the upper bucket 7 of the arm 6 has discharged its contents and as it passes down from its discharging position, the cam 23 acts through the links 21 and 22 and levers 20 to laterally move the endless conveyer out of the path of this bucket and into the path of the overhung buckets of the arm 5;—the frame of the conveyer sliding on the shaft 11 and sleeve 3 while its supporting rollers 14 move on the transverse guide 15. As the rearmost bucket 7 of the arm 5 moves from a position somewhat above that shown in Fig. 1 toward its highest position the material which it carries is similarly delivered onto the belt of the endless conveyer and as it thereafter moves down in a clockwise direction said conveyer is shifted laterally by its cam 23 out of the path of said bucket and into the path of movement of the buckets of the arm 6 as shown in Fig. 2.

The detail arrangement and construction of the various parts of the above described machine may be widely varied without departing from my invention, for it is obviously immaterial, for example, just what construction of power transmitting device is employed between the pulley 10 and the shaft 11 on which it is mounted. In the case illustrated I have shown said shaft 11 having a portion of square section designed to pass through the squared section central cavity of the hub of the pulley 10 which has its ends extended so as to rotatably engage the side frame members 36.

Likewise without departing from my invention the endless conveyer 8 may be so supported as to pivot instead of slide bodily, into and out of the paths of movement of the rotary buckets of each set and in such case one of the levers 20 and its associated links may be omitted. As indicated in Figs. 4 and 5, the upper end of the conveyer frame 70 would be supported to swing about a center line passing through the driving shaft 11ª. In order to transmit power to the driving pulley 10 regardless of the position of the conveyer this shaft would include suitable universal joints 72.

Under operating conditions, the lower or receiving end of the endless conveyer would be alternately swung from the path of one series of buckets into that of the other series in order to receive material discharged alternately from the sets of buckets without being afterward engaged thereby.

With the above described arrangement of parts the buckets will scoop material from a pile or dig it from a bank and alternately deliver it onto the endless conveyer belt which discharges it at an elevated point adjacent the front end of the machine from whence it will fall into a truck or hopper or upon another conveyer. By reason of the peculiar mounting and operation of the buckets and of the shiftable conveyer it is possible not only to materially shorten the over-all length of the machine, but to excavate or load a given quantity of material in less time than has hitherto been possible in machines of the same class.

I claim:

1. The combination of an endless belt conveyer; a bucket operative to discharge material thereon; with mechanism for moving one of said elements alternately into and out of the path of movement of the other to permit the conveyer to receive the material discharged by the bucket and thereafter allow passage of said bucket.

2. The combination of an endless conveyer; a rotary structure; at least one bucket on said structure overhanging the side thereof; and mechanism for moving one of the elements comprised by the conveyer and said structure alternately in opposite directions to bring it into and out of the path of movement of the other, to permit the bucket to deliver its contents to the conveyer and thereafter pass the same.

3. The combination of an endless conveyer; two bucket carrying structures respectively on opposite sides of said conveyer so positioned that the path of movement of the buckets of at least one of them intersect the path of movement of said conveyer; and means for shifting the conveyer to cause it to receive material from the buckets of said structures alternately and thereafter permit passage of said buckets.

4. The combination of an endless conveyer; excavating members including at least one overhung bucket; and means for periodically shifting said conveyer into and out of the path of movement of a bucket to cause it to receive material therefrom and thereafter permit its passage.

5. The combination of two rotatably mounted arms; means for turning said arms; buckets carried by the arms; a member for receiving material discharged by the buckets; and mechanism for shifting said member alternately into and out of position to receive material from each bucket.

6. The combination of two rotatably mounted arms; means for turning said arms; buckets projecting laterally from the arms respectively; a member mounted between the arms for receiving material discharged by the buckets; and means for shifting said member into the paths of movement of the buckets alternately so that after receiving material from any bucket it is moved out of the path thereof and into position to receive material from another bucket.

7. The combination of two concentrically mounted structures; means for rotating the same; buckets respectively carried by the structures and projecting beyond the sides thereof toward each other; an endless conveyer having a portion operative between said structures; and means for periodically shifting said portion of the conveyer to bring it into position to receive material alternately from the buckets.

8. The combination of a supporting frame; an endless conveyer movably mounted on said frame; other conveyers respectively mounted on opposite sides of said first conveyer; with means for laterally oscillating the first conveyer to move it into positions to receive material alternately from the second and third conveyers.

9. The combination of a supporting frame; an endless conveyer mounted thereon so as to be free to move bodily sidewise; two other conveyers respectively mounted on opposite sides of the first conveyer and adjusted to alternately discharge material; with mechanism for laterally reciprocating said first conveyer to move it into positions in which it will receive the material delivered by said second and third conveyers.

10. The combination of two loading conveyers operative in substantially parallel planes and each including at least one laterally overhung bucket; an endless conveyer movably mounted on the frame and having a portion extending between said loading conveyers; with cam actuated mechanism for oscillating said portion of the endless conveyer to move it into and out of the paths of movement of said buckets respectively.

11. The combination of a bucket and a belt conveyer operative in intersecting paths; with means for periodically moving one of said members to allow passage of the other through the path of movement of the first member.

12. The combination of two members comprising a bucket continuously moved in one direction and a conveyer; driving means for operating said members; and means for moving one of the members alternately into and out of a position in which its path of movement will intersect that of the other at the time the latter discharges material.

13. The combination of two conveyers operative in substantially parallel paths; a third conveyer operative in a shiftable path between those of said first conveyers; and mechanism for bodily moving the third conveyer to cause it to receive material from the other conveyers alternately.

14. The combination of a supporting frame; a driven shaft thereon; two sets of excavating members rotated by said shaft and mounted to discharge alternately; an endless conveyer passing around the shaft between the sets of excavating members; with mechanism for periodically shifting the position of said conveyer to permit it to receive the alternately-delivered material from the excavating members.

In witness whereof I affix my signature.

EDWIN G. RUST.